US007286453B2

(12) United States Patent
Suzuki et al.

(10) Patent No.: US 7,286,453 B2
(45) Date of Patent: Oct. 23, 2007

(54) ROTATION CONTROL DEVICE, METHOD THEREOF, PROGRAM THEREOF, RECORDING MEDIUM STORING THE PROGRAM, AND INFORMATION PROCESSING APPARATUS

(75) Inventors: Yasutaka Suzuki, Kawagoe (JP); Kazunori Matsuo, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 597 days.

(21) Appl. No.: 10/833,346

(22) Filed: Apr. 28, 2004

(65) Prior Publication Data
US 2005/0002301 A1    Jan. 6, 2005

(30) Foreign Application Priority Data
May 1, 2003    (JP)    ............................. 2003-126453

(51) Int. Cl.
*G11B 15/00*    (2006.01)
(52) U.S. Cl. .................................. 369/47.38; 369/53.3
(58) Field of Classification Search ............... 369/53.3, 369/53.18
See application file for complete search history.

(56) References Cited

U.S. PATENT DOCUMENTS

| | | | | |
|---|---|---|---|---|
| 5,329,512 | A | * | 7/1994 | Fukimoto et al. ........... 369/121 |
| 5,390,162 | A | * | 2/1995 | Fukumoto et al. .......... 369/116 |
| 5,461,603 | A | * | 10/1995 | Otsuka .................... 369/53.18 |
| 5,491,677 | A | * | 2/1996 | Sasaki ...................... 369/44.36 |
| 5,963,517 | A | | 10/1999 | Nakagaki et al. ............. 369/47 |
| 6,031,801 | A | | 2/2000 | Ishikawa et al. .............. 369/50 |
| 6,181,651 | B1 | * | 1/2001 | Kishimoto et al. ....... 369/44.28 |
| 6,563,776 | B1 | * | 5/2003 | Oi et al. .................. 369/53.15 |
| 6,636,468 | B2 | * | 10/2003 | Salmonsen et al. ....... 369/47.53 |
| 2003/0063544 | A1 | * | 4/2003 | Matsumoto .............. 369/59.14 |
| 2005/0030859 | A1 | * | 2/2005 | Nishimura et al. ....... 369/47.41 |

FOREIGN PATENT DOCUMENTS

JP    9-73729    3/1997

OTHER PUBLICATIONS

JP 2002-163854 (Nagato Minoru) Jun. 2002 (abstract only). □□□.*
JP 2002-056558 (Takei Tadayuki) Feb. 2002 (abstract only).□□.*
JP 2001-202-689 (Kanda Hiroshi) Jul. 2001 (abstract only). □□□.*
European Search Report dated Feb. 10, 2006.

* cited by examiner

*Primary Examiner*—Thang V. Tran
*Assistant Examiner*—Van T. Pham
(74) *Attorney, Agent, or Firm*—Kratz, Quintos & Hanson, LLP

(57) ABSTRACT

A temperature sensor (131) detects a temperature of a spindle motor (121) of a rotary drive unit (120) for rotating a disk-shaped recording medium (1), and a temperature information acquiring unit (134A) acquires the temperatures as temperature information. An eccentricity detector (132) detects a drive voltage level, and an eccentricity information acquiring unit (134B) acquires the drive voltage level as eccentricity information. When a determining unit (134C) determines that the temperature is higher than a predetermined temperature or that the drive voltage level is higher than a predetermined voltage, a servo controller (133) switches a rotation mode from constant liner velocity to constant angular velocity. That enables stable information processing over a long time with a simple strucure for constant linear velocity.

17 Claims, 4 Drawing Sheets

ROTATION CONTROL DEVICE, METHOD THEREOF, PROGRAM THEREOF, RECORDING MEDIUM STORING THE PROGRAM, AND INFORMATION PROCESSING APPARATUS

BACKGROUND OF THE INVENTION

1. Field of the Invention

The present invention relates to a rotation control device for controlling rotation of a disk-shaped recording medium, a method thereof, a program thereof, a recording medium storing the program, and an information processing apparatus.

2. Description of Related Art

There is a conventionally known art for rotating a disk-shaped recording medium, on which information is recorded by a constant linear velocity (CLV) system, with constant linear velocity to read the information by a reader (Refer to, for example, prior art: JP2000-132851A).

In this prior art, a spindle motor for rotating the recording medium is servo-controlled according to signals such as a synchronization signal and a sub-code signal read from the recording medium.

In such art for rotating the recording medium with constant linear velocity, since information reading is stably performed without any error-rate change, its control structure can be simplified. On the other hand, the rotational velocity varies according to a record position of information to be read in the recording medium. Therefore, the eccentricity also varies during rotation, and that puts the load on reading operation such as tracking control. Besides, the spindle motor needs to be variably driven in order to rotate the recording medium with constant linear velocity according to variation of the eccentricity. Depending on the value of the eccentricity, the consumption current for driving the spindle motor increases, so that the heat release from the spindle motor also increases. That might adversely affect the reader located adjacent to the spindle motor.

SUMMARY OF THE INVENTION

A main object of the present invention is to provide a rotation control device capable of inhibiting at least increase of consumption current and heat release, a method thereof, a program thereof, a recording medium storing the program and an information processing apparatus.

A rotation control device for controlling a rotation of a disk-shaped recording medium according to an aspect of the present invention, includes: a rotary drive unit for rotating the recording medium; a reader for reading information recorded on the recording medium; a temperature sensor for detecting a temperature adjacent to the recording medium when the reader reads the information; a determining unit for determining whether the temperature detected by the temperature detector is higher than a predetermined temperature; and a rotation control unit for controlling the rotary drive unit to rotate the recording medium with a constant angular velocity when the determining unit determines that the detected temperature is higher than the predetermined temperature.

A rotation control device for controlling a rotation of a disk-shaped recording medium according to another aspect of the present invention, includes: a rotary drive unit for rotating the recording medium; an eccentricity detector for detecting an eccentricity of the rotating recording medium, a determining unit for determining whether the eccentricity detected by the eccentricity detector is greater than a predetermined value; and a rotation control unit for controlling the rotary drive unit to rotate the recording medium with a constant angular velocity when the determining unit determines that the eccentricity is greater than the predetermined value.

A rotation control method for controlling a rotation of a disk-shaped recording medium when a reader reads information recorded on the disk according to a further aspect of the present invention, includes the steps of: determining whether a temperature adjacent to the recording medium when the information is read is higher than a predetermined temperature; and rotating the recording medium with a constant angular velocity when it is determined that the temperature is higher than the predetermined temperature.

A rotation control method for controlling rotation of a disk-shaped recording medium according to still a further aspect of the present invention, includes the steps of: determining whether an eccentricity of the rotating recording medium is greater than a specified value; and rotating the recording medium with a constant angular velocity when it is determined that the eccentricity is greater than the specified value.

A rotation control program according to yet another aspect of the present invention executes any one of the rotation control methods of the present invention by a computer.

A recording medium according to still another aspect of the present invention stores the rotation control program of the present invention in a manner readable by the computer.

An information processing apparatus according to yet a further aspect of the present invention, includes: a reader for reading information recorded on a disk-shaped recording medium; any one of the rotation control devices of the present invention; a rotary drive unit controlled by the rotation control device; and an information processing unit for processing the information read by the reader so that the information can be output.

DETAILED DESCRIPTION OF PREFERRED EMBODIMENT(S)

An embodiment according to an information processing apparatus of the present invention will be described below with reference to attached drawings.

[Structure of Information Processing Apparatus]

Figure 1:
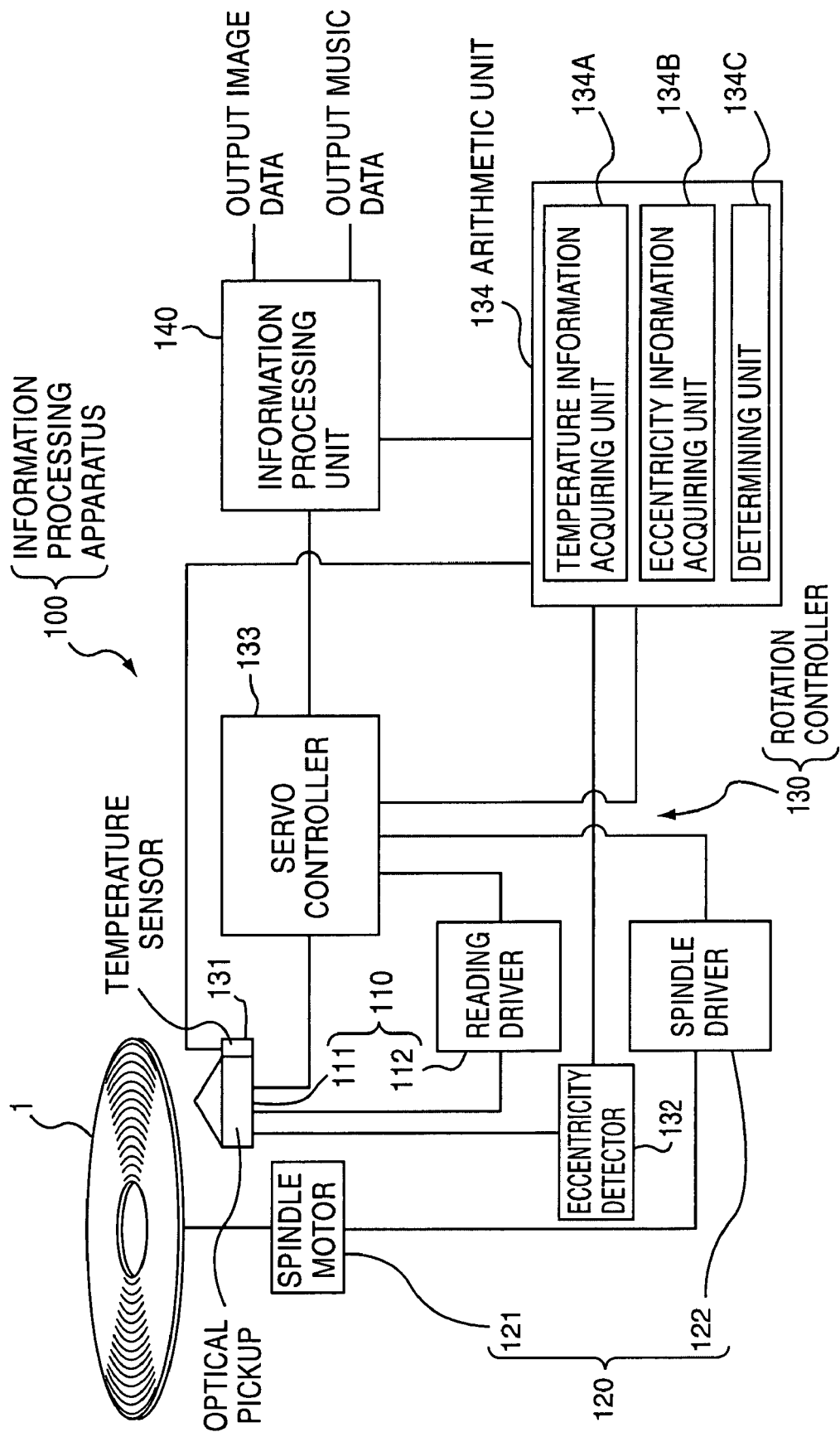
FIG. 1 is a block diagram schematically showing structure of an information processing apparatus according to an embodiment of the present invention.
Figure 2:
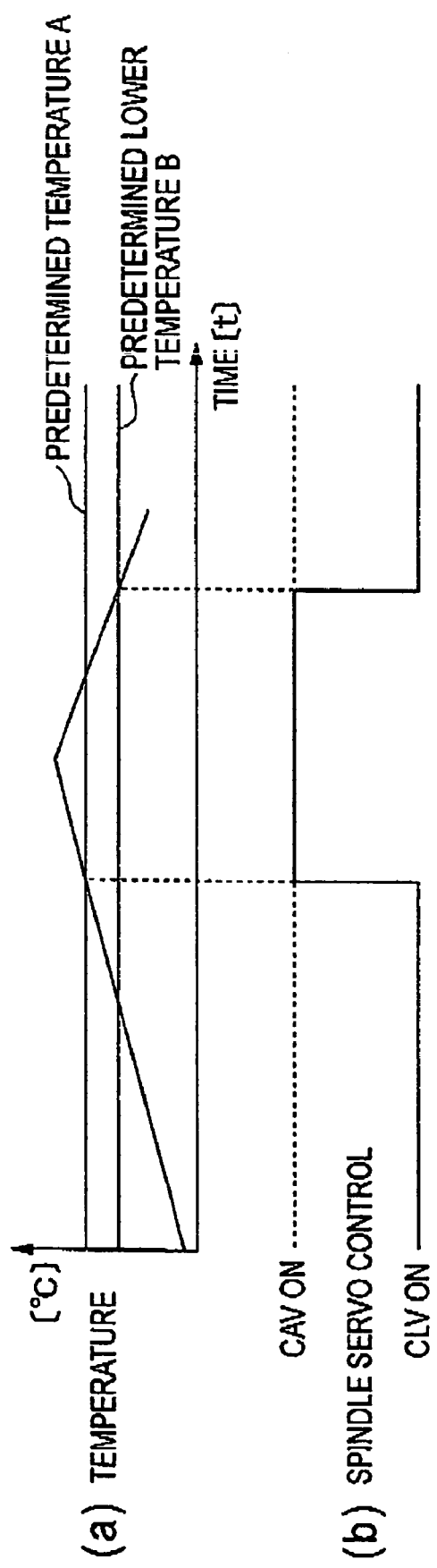
FIG. 2 is an illustration showing relationship between a temperature of an optical pickup detected by a temperature sensor and a rotation mode of a disk-shaped recording medium according to the above embodiment, in which (a) shows change of a temperature around the optical pickup with the passage of time and (b) shows the rotation mode of the disk-shaped recording medium according to the change of the temperature around the optical pickup.
Figure 3:
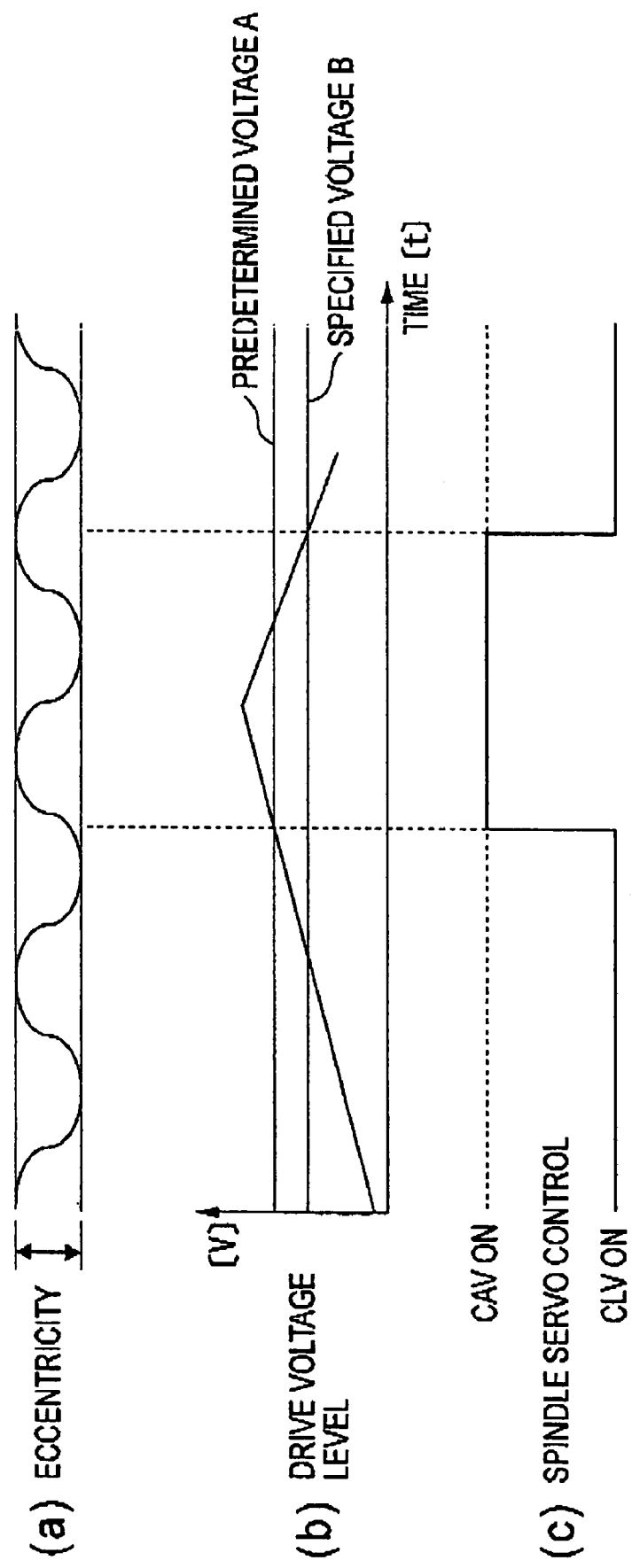
FIG. 3 is an illustration showing relationship between a drive voltage level detected by an eccentricity detector and the rotation mode of the disk-shaped recording medium according to the above embodiment, in which (a) schematically shows a disk eccentricity, (b) shows change of a drive voltage level of a tracking actuator, and (c) shows the rotation mode of the disk-shaped recording medium according to the change of the drive voltage level of the tracking actuator.

FIG. 1 is a block diagram schematically showing structure of an information processing apparatus. FIG. 2 is an illustration showing relationship between a temperature around an optical pickup detected by a temperature sensor and a rotation mode of a disk-shaped recording medium, in which (a) shows change of the temperature around the optical pickup with the passage of time and (b) shows the rotation mode of the disk-shaped recording medium according to the change of the temperature around the optical pickup. FIG. 3 is an illustration showing relationship between a drive voltage detected by an eccentricity detector and the rotation mode of the disk-shaped recording medium, in which (a) schematically shows a disk eccentricity, (b) shows change of a drive voltage level of a tracking actuator and (c) shows the rotation mode of the disk-shaped recording medium according to the change of the drive voltage level of the tracking actuator.

In FIG. 1, a reference numeral 100 denotes the information processing apparatus that acquires information recorded on a disk-shaped recording medium 1 set on a predetermined position and processes it for output. The information processing apparatus 100 includes a reader 110, a rotary drive unit 120, a rotation controller 130 and an information processing unit 140.

The disk-shaped recording medium 1 may be, for example, a CD-DA (Compact Disk-Digital Audio), a CD-ROM (Compact Disk-Read Only Memory), a DVD-ROM (Digital Versatile Disc-Read Only Memory), a DVD-R (Digital Versatile Disc-Recordable), a DVD-RW (Digital Versatile Disc-ReWritable), a MD (Mini Disc), a MO (Magneto-Optical disk), or a FD (Flexible Disc). Other than these, the disk-shaped recording medium 1 may be any recording medium including a disk-shaped recording medium capable of recording information and a disk-shaped recording medium on which information is recorded.

The reader 110 reads information recorded on the recording medium 1. The reader 110 has an optical pickup 111, a feed motor (not shown) and a reading driver 112. The optical pickup 111 is positioned adjacent to the recording medium 1 set on the predetermined position. The optical pickup 111 irradiates a laser beam onto an information recording surface of the recording medium 1 on which the information is recorded, receives a reflected light reflected by the information recording surface and photoelectrically converts the reflected light to acquire the information as an electrical signal. The feed motor moves the optical pickup 111 radially in parallel to the information recording surface of the recording medium 1. The reading driver 112 drives a focus actuator and a tracking actuator (both not shown) provided in the optical pickup 111 to adjust a focal length of the beam irradiated by the optical pick-up 111 from the information recording surface and its focal position on the information recording surface.

The rotary drive unit 120 rotates the recording medium 1 set on the predetermined position of the information processing apparatus 100 with constant linear velocity or with constant angular velocity. The rotary drive unit 120 includes a holder (not shown), a spindle motor 121 and a spindle driver 122. The holder rotatably holds the recording medium 1. The spindle motor 121 is linked with the holder to rotate the holder. The spindle driver 122 drives the spindle motor 121 to rotate the recording medium 1 with constant linear velocity (CLV), i.e., with variable rotational velocity, or with constant angular velocity (CAV), i.e., with constant rotational velocity.

The rotation controller 130 controls the rotation mode of the recording medium 1 rotated by the rotary drive unit 120. The rotation controller 130 includes a temperature sensor 131 as a temperature detector, an eccentricity detector 132, a servo controller 133 as a rotation control unit, and an arithmetic unit 134.

The temperature sensor 131 is composed of, for example, a thermistor circuit and provided in the optical pickup 111 to detect a temperature adjacent to the recording medium 1 set on the predetermined position. The thermistor circuit includes a resistance and a thermistor connected in series, and the resistant value of the thermistor changes according to the change of the temperature around the optical pickup 111. According to the change of the resistance value, a voltage at a connection point of the resistance and the thermistor also changes. By detecting the change of this voltage, the temperature around the optical pickup 111, i.e., the temperature adjacent to the recording medium 1 is detected. The temperature sensor 131 outputs information obtained based on the temperature detection as temperature information to the arithmetic unit 134.

The eccentricity detector 132 detects an eccentricity of the recording medium 1 in rotation motion. The eccentricity is detected by, for example, reading a drive voltage level found based on a drive voltage that the reading driver 112 supplies to the tracking actuator and a sensitivity of the tracking actuator when the optical pickup 111 reads the information from the rotating recording medium 1. When the recording medium 1 is rotated with CLV, the drive voltage level of the tracking actuator fluctuates due to the eccentricity of the recording medium 1. If the eccentricity of the rotating recording medium 1 fluctuates, it is required to control the drive of the optical pickup 111 in tracking direction for tracking the eccentricity. The servo controller 133 is designed to perform tracking servo control based on the information acquired from the optical pickup 111. When the recording medium 1 becomes eccentric, a receivable amount of light reflected by the information recording surface reduces and accordingly the sensitivity of the tracking actuator lowers. In response, the servo controller 133 performs the tracking servo control to adjust an irradiation position while varying the drive voltage supplied to the tracking actuator. Depending on the value of the eccentricity, the drive voltage that the reading driver 112 supplies to the tracking actuator fluctuates. That is, by monitoring the fluctuation of the drive voltage level found based on the sensitivity of the tracking actuator and the drive voltage supplied to the tracking actuator, the eccentricity of the recording medium 1 can be detected. FIG. 3(a) shows a waveform of the drive voltage level found based on the sensitivity of the tracking actuator and the drive voltage supplied to the tracking actuator. The eccentricity is detected based on the difference between the peak and the bottom of the waveform. The eccentricity detector 132 outputs the drive voltage level as eccentricity information to the arithmetic unit 134.

The servo controller 133 is connected to the optical pickup 111, the reading driver 112, the spindle driver 122. the arithmetic unit 134 and the information processing unit 140. The servo controller 133 recognizes drive states of the focus actuator and the tracking actuator of the optical pickup 111 and controls the reading driver 112 for controlling the drive of the focus actuator and the tracking actuator. The servo controller 133 also controls the spindle driver 122, i.e., performs spindle servo control, to rotate the recording medium 1 with CLV or CAV. The servo controller 133 acquires the electrical signal output from the optical pickup 111 and performs a predetermined signal processing to output signal-processed information. to the information processing unit 140. The servo controller 133 is mainly composed of a circuit such as a PPL (Phase Locked Loop) circuit with a simple circuit configuration for rotating the recording medium 1 with CLV. Although the servo controller 133 composed of the PPL circuit has the simple circuit configuration for rotating the recording medium 1 with CLV, the PPL circuit can perform the servo control with CAV by softwarily modifying its design such as a servo control system of the reading driver 112 and the spindle driver 122. That is, the servo controller 133 in this embodiment performs the servo control with CLV and the servo control with CAV while switching them according to a command to perform a linear velocity operation or a command to perform an angular velocity operation from the arithmetic unit 134. As the servo controller 133 is so configured to mainly perform the servo control with CLV, its accuracy for reading the information recorded on the recording medium 1 and the like decrease to some extent while performing the servo control with CAV. The arithmetic unit 134 controls the information processing apparatus 100 entirely. The arithmetic unit 134 controls the servo controller 133 to perform a CLV control operation (hereinafter referred to as a CLV operation) for controlling the spindle driver 122 to rotate the recording medium 1 with CLV and a CAV control operation (hereinafter referred to as a CAV operation) for controlling the spindle driver 122 to rotate the recording medium 1 with CAV.

Te arithmetic unit 134 includes a temperature information acquiring unit 134A, an eccentricity information acquiring unit 134B, an internal memory (not shown) and a determining unit 134C.

The temperature acquiring unit 134A acquires the temperature information output from the temperature sensor 131. The eccentricity information acquiring unit 134B acquires the eccentricity information output from the eccentricity detector 132. The internal memory, as shown in FIG. 2(a) and FIG. 3(b), stores a predetermined temperature A, a predetermined lower temperature B lower than the predetermined temperture A, a predetermined voltage A, and a specified voltage B lower than the predetermined voltage A as thresholds. A predetermined value for the eccentricity in the present invention corresponds to the predetermined voltage A, and a specified value for the eccentricity in the present invention corresponds to the specified voltage B.

According to the temperature information acquired by the temperature information acquiring unit 134A, the determining unit 134C compares the temperature detected by the temperature sensor 131 and the predetermined temperature A prestored in the internal memory and determines whether the temperature detected by the temperature sensor 131 is higher than the predetermined temperature A or not. Furtherer, according to the eccentricity information from the eccentricity detector 132 detected by the eccentricity information acquiring unit 134D, the determining unit 134C compares the drive voltage level detected by the eccentricity detector 132 and the predetermined voltage A prestored in the internal memory and determines whether the detected drive voltage level is higher than the predetermined drive voltage A or not.

If the determining unit 134C determines that the detected temperature is higher than the predetermined temperature A or the detected eccentricity is higher than the predetermined voltage A, the arithmetic unit 134 sends a signal to the servo controller 133 for performing the CAV operation to rotate the recording medium 1, which has been rotated with CLV, with CAV. That is, if the temperature information acquired by the temperature information acquiring unit 134A becomes higher than the predetermined temperature A as shown in FIG. 2(a), the arithmetic unit 134 controls the servo controller 133 to switch from the CLV operation to the CAV operation as shown in FIG. 2(b). Also, if the drive voltage level in the eccentricity information acquired by the eccentricity information acquiring unit 134B becomes higher than the predetermined voltage A as shown in FIG. 3(b), the arithmetic unit 134 controls the servo controller 133 to switch from the CLV operation to the CAV operation as shown in FIG. 3(c).

If the determining unit 134C determines that the temperature information acquired by the temperature information acquiring unit 134A drops below the predetermined lower temperature B, which is lower than the predetermined temperature A, while the arithmetic unit 134 controls the servo controller 133 to perform the CAV operation as shown in FIG. 2(a), the arithmetic unit 134 controls the servo controller 133 to switch from the CAV operation to the CLV operation as shown in FIG. 2(b). Also, if the determining unit 134C determines that the eccentricity information (drive voltage level) acquired by the eccentricity information acquiring unit 134B drops below the specified voltage B, which is lower than the predetermined voltage A, while the arithmetic unit 134 controls the servo controller 133 to perform the CAV operation as shown in FIG. 3(b), the arithmetic unit 134 controls the servo controller 133 to switch from the CAV operation to the CLV operation as shown in FIG. 3(c). According to the command from the arithmetic unit 134, the servo controller 133 controls the spindle driver 122 to rotate the recording medium 1 with CLV (CLV ON shown in FIGS. 2 and 3) or to rotate the recording medium 1 with CAV (CAV ON shown in FIGS. 2 and 3).

The information processing unit 140 is connected to the servo controller 133 and the arithmetic unit 134. The information processing unit 140 acquires an electrical signal corresponding to the information from the optical pickup 111 acquired by the servo controller 133 and appropriately processes it. For example, the information processing unit 140 decrypts an electrical signal read and converted by the optical pickup 111 into an image data or a music data to output it to an output unit such as a speaker or a display connected to the information processing unit 140. Thus the information recorded on the recording medium 1 is reproducibly processed. The information processed by the information processing unit 140 is output to the output unit.

In the rotation with CAV, as information volume to be read per unit of time differs at its outer periphery of the recording medium 1 and at its inner periphery, it is required to variably control a transfer rate for transferring the read information to stably acquire information. That makes the control circuit complex, inhibiting manufacturing cost reduction. However, since the rotation with CAV is a drive system for keeping the rotational velocity constant regardless of the eccentricity, there is an advantage that almost no increase of the current consumed for driving the spindle motor and of the heat release from the spindle motor are caused by the impact of the eccentricity. The present invention intends to solve the above described problems of the rotation with CLV by taking such advantage of the rotation with CAV.

[Operation of Information Processing Apparatus]

The operation of the above information processing apparatus 100 will be described below.

Firstly, the relationship between the eccentricity of the rotating disk-shaped recording medium 1 and the consumption current for driving the spindle motor 121 is described with reference to FIG. 4.

For rotating the recording medium 1 with CAV, the drive state of spindle motor 121 is controlled to be constant. Therefore a voltage for controlling the drive of the spindle motor 121 stays constant regardless of the eccentricity of the recording medium 1, so that the consumption current stays substantially constant with no increase as shown in FIG. 4 (See SPINDLE CAV SERVO). Accordingly, when the recording medium 1 rotates with CAV, neither the consumption current of the spindle motor 121 nor the heat release of the spindle motor 121 increases.

On the other hand, for rotating the recording medium 1 with CLV, the rotational velocity of the spindle motor 121 is appropriately changed according to a reading position of information recorded in the recording medium 1 to keep the linear velocity constant. Therefore the voltage supplied to the spindle motor 121 varies according to the value of the eccentricity of the recording medium 1, so that the consumption current also increases as shown in FIG. 4 (See SPINDLE CLV SERVO). Accordingly, when the recording medium 1 rotates with CLV, the consumption current of the spindle motor 121 increases according to the eccentricity, and the heat release of the spindle motor 121 also increases.

As described above, since the heat release differs depending on the rotation mode of the recording medium 1, i.e., the rotation with CAV and the rotation with CLV, the information processing apparatus 100 controls the rotation mode of the recording medium 1 to prevent the impact of the heat so as to process information.

More specifically, when the recording medium 1 is set on the predetermined position of the information processing apparatus 100, the arithmetic unit 134 operates the temperature information acquiring unit 134A to acquire the temperature information detected by the temperature sensor 131 as well as the eccentricity information acquiring unit 134B to acquire the eccentricity information on the drive voltage level detected by the eccentricity detector 132. According to the temperature information acquired by the temperature information acquiring unit 134A, the arithmetic unit 134 operates the determining unit 134C to compare the temperature detected by the temperature sensor 131 and the predetermined temperature A prestored in the internal memory and determine whether the temperature detected by the temperature sensor 131 is higher than the predetermined temperature A or not. Further, according to the eccentricity information from the eccentricity detector 132 detected by the eccentricity information acquiring unit 134B, the arithmetic unit 134 operates the determining unit 134C to compare the drive voltage level detected by the eccentricity detector 132 and the predetermined voltage A prestored in the internal memory and determine whether the detected drive voltage level is higher than the predetermined drive voltage A.

The determining unit 134C determines that neither the consumption current nor the heat release increases at the time of setting the recording disk 1. In response to the determination of the determining unit 134C, the arithmetic unit 134 sends a signal to the servo controller 133 for performing a CLV operation, so that the servo controller 133 controls the drive of the spindle motor 121 to rotate the recording medium 1 with CLV.

With this drive of the spindle motor 121, the optical pickup 111 reads information from the recording medium 1 rotating with CLV, and the information processing unit 140 processes the information to output it to the output unit (not shown) for reproduction.

In the rotation with CLV, if the eccentricity remains relatively high due to the different eccentricities of the recording medium 1 itself and characteristics of the spindle motor 121 itself, the drive of the spindle motor 121 is controlled according to the eccentricity. That is, the drive is controlled by appropriately changing the voltage. When the eccentricity increases as described above, the drive voltage level of the tracking actuator also increases. And the eccentricity detector 132 detects the increased drive voltage level.

Figure 4:
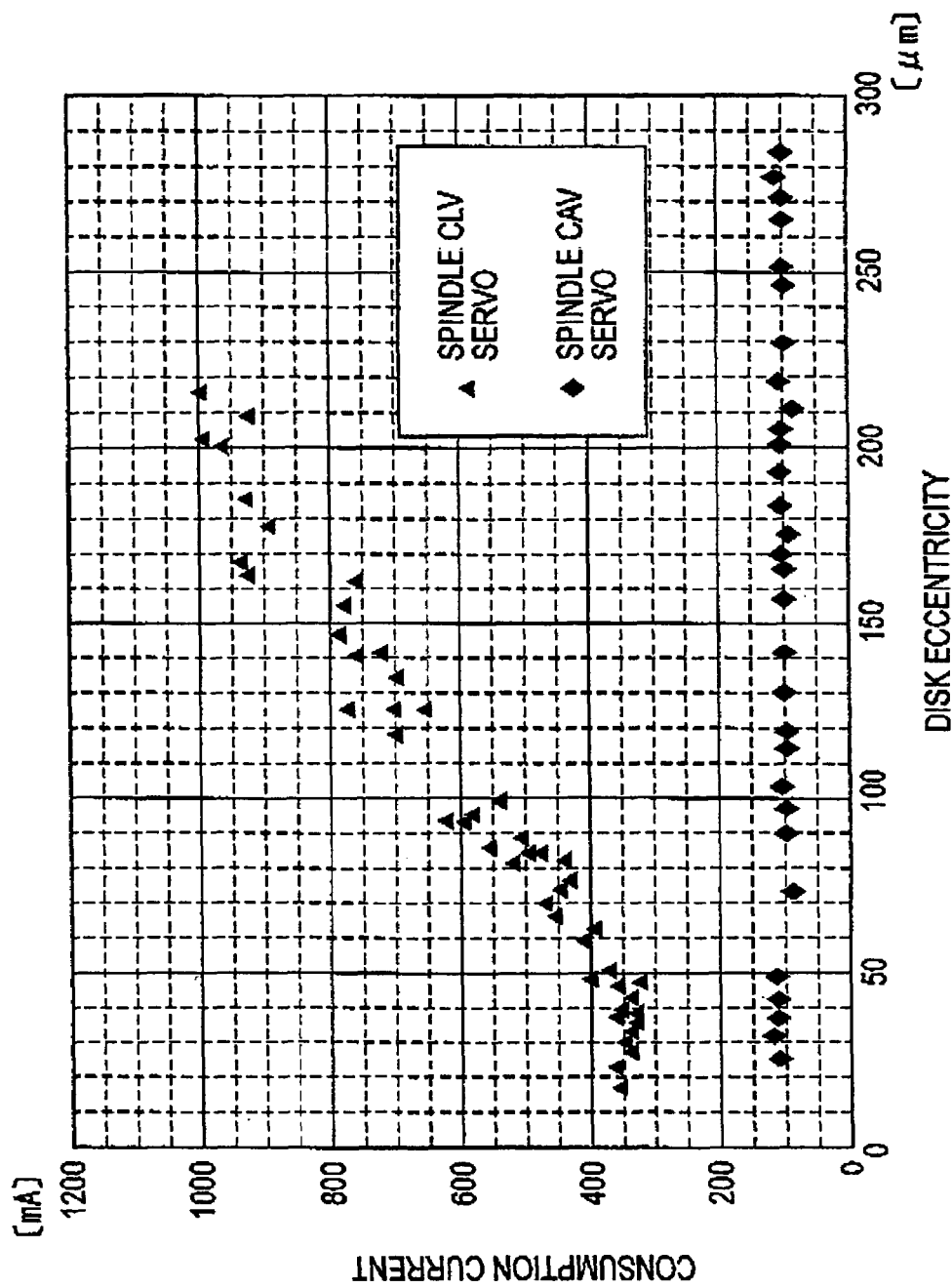
FIG. 4 is a graph showing relationship between an eccentricity of the rotating disk-shaped recording medium and a consumption current for controlling drive of a spindle motor according to the above embodiment.

When the voltage supplied to the spindle motor 121 increases to some extent according to the value of the eccentricity as shown in FIG. 4, the consumption current increases, so that the heat release also increases. That is, since the drive voltage level of the tracking actuator changes according to the value of the eccentricity, the eccentricity can be found by detecting the drive voltage level and accordingly the voltage supplied to the spindle motor 121, or the increase of the consumption current and the heat release can be found. If the control for the rotation with CLV continues, the heat of the spindle motor 121 is not sufficiently discharged. Then the temperature around the optical pickup 111 increases at certain level. As shown in FIG. 2(a), the temperature sensor 131 detects the increased temperature around the optical pickup 111, which has low heat resistance.

Then, when the determining unit 134C recognizes at least either of the following states: the drive voltage level of the tracking actuator detected by the eccentricity detector 132 becomes higher than the predetermined voltage A as shown in FIG. 3(b); or the temperature around the optical pickup 111 detected by the temperature sensor 131 becomes higher than the predetermined temperature A as shown in FIG. 2(a), the arithmetic unit 134 sends a signal to the servo controller 133 to switch from the CLV operation for the rotation with CLV to the CAV operation for the rotation with CAV. The servo controller 133 controls the spindle driver 122 according to the signal sent from the arithmetic unit 134 to perform the CAV operation for rotating the recording medium 1 with CAV. The optical pickup 111 reads the information from the recording medium 1 rotating with CAV and the information processing unit appropriately processes it. Since the circuit configuration of the servo controller 133 is designed to perform the rotation with CLV, the information acquired and processed under the CAV operation such as image data will be displayed on the screen with relatively low accuracy.

If processing continues with CAV, since the voltage for controlling the drive of the spindle motor 121 stays constant, the consumption current for the rotation with CAV shown in FIG. 4 comes to stay constant and the heat release also comes to stay constant. Then as shown in FIG. 2(a), the temperature around the optical pickup 111, which has been higher than the predetermined temperature A, gradually decreases to be lower than the predetermined lower temperature B. Also, since the constant rotational velocity inhibits the fluctuation of the drive voltage level of the tracking actuator, the drive voltage level of the tracking actuator, which has been higher than the predetermined voltage A, gradually decreases to be lower than the specified voltage B as shown in FIG. 3(b). Accordingly, when the determining unit 134C recognizes at least either of the following states: the temperature detected by the temperature sensor 131 becomes lower than the predetermined lower temperature B; or the drive voltage level detected by the eccentricity detector 132 becomes lower than the specified voltage B, the arithmetic unit 134 sends a signal to the servo controller 133 to perform the CLV operation again, so that the servo controller 133 controls the spindle driver 122 to perform the CLV operation.

As described earlier, in the above embodiment, when the determining unit 134C determines whether the temperature around the optical pickup 111 detected by the temperature sensor 131 is higher than the predetermined temperature A and determines that the temperature is higher than the predetermined temperature A, the arithmetic unit 134 sends the signal to the servo controller 133 to rotate the recording medium 1 with CAV and the servo controller 133 controls the spindle driver 122 to perform the CAV operation.

The rotation with CAV reduces the heat release of the spindle motor 121, which is a heat source, and thereby inhibiting the rise of the temperature around the optical pickup 111 having relatively low heat resistance. This reduces the heat load during the information reading and eliminates the need for a special structure with high cooling efficiency, and prolongs the service life of the optical pickup 111. When the heat load is not so high, the rotation control with CLV having the simple information-reading structure is applied, thereby facilitating simplification of the structure.

When the eccentricity detected by the eccentricity detector 132 during the rotation of the recording medium 1 is greater than the predetermined value, i.e., when the determining unit 134C determines whether the drive voltage level of the tracking actuator corresponding to the eccentricity is higher than the predetermined voltage A and determines that the level is higher than the predetermined voltage A, the arithmetic unit 134 sends the signal to the servo controller 133 to rotate the recording medium 1 with CAV and the servo controller 133 controls the spindle driver 122 to perform the CAV operation.

The rotation control with CAV inhibits the eccentricity fluctuation of the recording medium 1 and reduces the heat release of the spindle motor 121, which is a heat source, and thereby inhibiting the rise of the temperature around the optical pickup 111 having relatively low resistance against the heat load. This reduces the heat load during the information reading and eliminates the need for the special structure with high cooling efficiency, and prolongs the service life of the optical pickup 111. When the heat load is not so high, the rotation control with CLV having the simple information-reading structure is applied, thereby facilitating simplification of the structure as described above.

Since the drive voltage level of the actuator increases with the increase of the eccentricity, the increase of the consumption current of the spindle motor 121 and accompanying increase of the heat release can be found by detecting the drive voltage level as the eccentricity.

Since the rotation control is switched from CLV to CAV, sirnplification of the structure is possible without a special flexibility to the eccentricity and to the temperature.

When the rotation control with CAV reduces the heat load to cool the optical pickup 111 and thus decreases the temperature detected by the temperature sensor 131 and the eccentricity detected by the eccentricity detector 132, the rotation control with CAV is switched to the rotation control with CLV at the predetermined lower temperature 131 that is a threshold lower than the predetermined temperature A or at the specified voltage B that is a threshold lower than the predetermined voltage A. That can prevent frequent switching between the control with CAV and the control with CLV around the thresholds at the decrease of the heat load, thereby reducing the processing load as well as enabling the stable informnation processing.

The switching of the rotation control is performed based on the detected temperature around the optical pickup 111, which has relatively low heat resistance. This structure more surely protects the optical pickup 111 from the heat load and enables stable information reading over a long period.

Modifications of Embodiments

The present invention is not limited to the above specific embodiment, but includes modifications as long as the objects of the present invention can be attained.

The disk-shaped recording medium 1 may be any disk-shaped recording medium capable of recording information as mentioned earlier.

The information processing apparatus 100 for outputting the processed information to the output unit for reproduction or the like may be a personal computer, an audio-visual device, an acoustic device, a driver or the like.

Although the temperature around the optical pickup 111 of the reader 110 is detected in the above embodiment, the same effect can be obtained if the temperature may be that of the optical pickup 111 itself, the temperature of the spindle motor 121 as the heat source, or the temperature around the spindle motor 121. That is, the position to detect the temperature may be any position as long as the temperature adjacent to the recording medium 1 during information reading of the optical pickup 111 is detectable.

In the above embodiment, the eccentricity of the rotating recording medium 1 is detected based on the drive voltage level of the tracking actuator. Other than this, any configuration may be applicable as long as the eccentricity is detectable. For example, the consumption current of the spindle motor 121 may be read and compared with a threshold, or the voltage that the spindle driver 122 drives the spindle motor 121 may be read and acquired by the ecentricity information acquiring unit 134B of the arithmetic unit 134 for the eccentricity detection.

The arithmetic unit 134 may be configured as a single personal computer; a plurality of computers connected over a network; an element such as a microcomputer IC or CPU; or a circuit board on which a plurality of electronic parts are mounted. The arithmetic unit 134 may be a program stored in a recording medium or a program acquired over the network that can fuiction as the arithmetic unit 134 after installation of the program. Accordingly, that can easily expand the use.

The configuration and procedures for implementing the above embodiment may be appropriately modified as long as the scope of the present invention can be attained.

What is claimed is:

1. A rotation control device for controlling a rotation of a disk-shaped recording medium, comprising:
   a rotary drive unit for rotating the recording medium;
   a reader for reading information recorded on the recording medium;
   a temperature sensor for detecting a temperature adjacent to the recording medium when the reader reads the information;
   a determining unit for determining whether the temperature detected by the temperature detector is higher than a predetermined temperature; and a rotation control unit for controlling the rotary drive unit to rotate the recording medium with a constant angular velocity when the determining unit determines that the detected temperature is higher than the predetermined temperature.

2. The rotation control device according to claim 1, wherein the rotation control unit controls the rotary drive unit to rotate the recording medium with a constant linear velocity when the determining unit determines that the temperature detected by the temperature detector is not higher than a predetermined temperature.

3. The rotation control device according to claim 2, wherein the determining unit determines whether the temperature detected by the temperature detector is lower than a predetermined lower temperature, which is lower than the predetermined temperature, while the rotation control unit controls the recording medium to rotate with the constant angular velocity, and wherein the rotation control unit controls the rotary drive unit to switch the rotation of the recording medium from the constant angular velocity to the constant linear velocity when the determining unit determines that the detected temperature is lower than the predetermined lower temperature.

4. A rotation control device for controlling a rotation of a disk-shaped recording medium, comprising:

a rotary drive unit for rotating the recording medium;

an eccentricity detector for detecting an eccentricity of the rotating recording medium, a determining unit for determining whether the eccentricity detected by the eccentricity detector is greater than a predetermined value; and a rotation control unit for controlling the rotary drive unit to rotate the recording medium with a constant angular velocity when the determining unit determines that the eccentricity is greater than the predetermined value.

5. The rotation control device according to claim 4, wherein the eccentricity detector detects a voltage when the rotary drive unit rotates the recording medium to detect the eccentricity, and wherein the determining unit determines that the eccentricity is higher than the predetermined value when the voltage detected by the eccentricity detector is higher than a predetermined voltage.

6. The rotation control device according to claim 4, wherein the eccentricity detector detects a consumption current when the rotary drive unit rotates the recording medium to detect the eccentricity, and wherein the determining unit determines that the eccentricity is greater than the predetermined value when the consumption current detected by the eccentricity detector is higher than a predetermined current.

7. The rotation control device according to claim 4, further comprising:

a reader for reading information recorded on the recording medium; and a tracking actuator for driving the reader, wherein the eccentricity detector detects a drive voltage level of the tracking actuator, and wherein the determining unit determines that the eccentricity is greater than the predetermined value when the eccentricity detector detects a drive voltage level higher than a predetermined voltage.

8. The rotation control device according to claim 4, wherein the rotation control unit controls the rotary drive unit to rotate the recording medium with a constant linear velocity when the determining unit determines that the eccentricity detected by the eccentricity detector is less than the predetermined value.

9. The rotation control device according to claim 8, wherein the determining unit determines whether the eccentricity detected by the eccentricity detector is smaller than a specified value, which is smaller than the predetermined value, while the rotation control unit controls the recording medium to rotate with the constant angular velocity, and wherein the rotation control unit controls the rotary drive unit to switch the rotation of the recording medium from the constant angular velocity to the constant linear velocity when the determining unit determines that the detected eccentricity is smaller than the specified value.

10. A rotation control method for controlling a rotation of a disk-shaped recording medium when a reader reads information recorded on the disk, comprising the steps of:

determining whether a temperature adjacent to the recording medium when the information is read is higher than a predetermined temperature; and rotating the recording medium with a constant angular velocity when it is determined that the temperature is higher than the predetermined temperature.

11. A rotation control method for controlling rotation of a disk-shaped recording medium, comprising the steps of:

determining whether an eccentricity of the rotating recording medium is greater than a specified value; and rotating the recording medium with a constant angular velocity when it is determined that the eccentricity is greater than the specified value.

12. A rotation control program stored in a recording medium in a computer readable manner that executes a rotation control method for controlling a rotation of a disk-shaped recording medium when a reader reads information recorded on the disk by a computer, the method comprising the steps of:

determining whether a temperature adjacent to the recording medium when the information is read is higher than a predetermined temperature; and rotating the recording medium with a constant angular velocity when it is determined that the temperature is higher than the predetermined temperature.

13. A rotation control program that executes a rotation control method for controlling a rotation of a disk-shaped recording medium when a reader reads information recorded on the disk by a computer, the method comprising the steps of:

determining whether an eccentricity of the rotating recording medium is greater than a specified value; and rotating the recording medium with a constant angular velocity when it is determined that the eccentricity is greater than the specified value.

14. A recording medium storing a rotation control program in a manner readable by a computer, wherein the program executes a rotation control method for controlling a rotation of a disk-shaped recording medium when a reader reads information recorded on the disk by the computer, the method comprising the steps of:

determining whether a temperature adjacent to the recording medium when the information is read is higher than a predetermined temperature; and rotating the recording medium with a constant angular velocity when it is determined that the temperature is higher than the predetermined temperature.

15. A recording medium storing a rotation control program in a manner readable by a computer, wherein the program executes a rotation control method for controlling a rotation of a disk-shaped recording medium when a reader reads information recorded on the disk by the computer, the method comprising the steps of:

determining whether an eccentricity of the rotating recording medium is greater than a specified value; and rotating the recording medium with a constant angular velocity when it is determined that the eccentricity is greater than the specified value.

16. An information processing apparatus, comprising:

a reader for reading information recorded on a disk-shaped recording medium;

a rotation control device according to claim 1;

a rotary drive unit controlled by the rotation control device; and an information processing unit for processing the information read by the reader so that the information can be output.

17. An information processing apparatus, comprising:

a reader for reading information recorded on a disk-shaped recording medium;

a rotation control device according to claim 4;

a rotary drive unit controlled by the rotation control device; and an information processing unit for processing the information read by the reader so that the information can be output.

\* \* \* \* \*